(12) United States Patent
Lausch et al.

(10) Patent No.: US 6,843,220 B2
(45) Date of Patent: Jan. 18, 2005

(54) SELF-IGNITING, MIXTURE-COMPRESSING INTERNAL COMBUSTION ENGINE AND METHOD FOR ITS OPERATION

(75) Inventors: Wolfram Lausch, Augsburg (DE); Robert Glauber, Friedberg (DE); Günther Heider, Grossaitingen (DE); Kai Rieck, Gersthofen (DE)

(73) Assignee: MAN B&W Diessel Aktiengesellschaft, Augsburg (DE)

( * ) Notice: Subject to any disclaimer, the term of this patent is extended or adjusted under 35 U.S.C. 154(b) by 0 days.

(21) Appl. No.: 10/414,945

(22) Filed: Apr. 16, 2003

(65) Prior Publication Data

US 2003/0196634 A1 Oct. 23, 2003

(30) Foreign Application Priority Data

Apr. 23, 2002 (DE) .......................................... 102 17 996

(51) Int. Cl.⁷ ................................................ F02B 19/00
(52) U.S. Cl. ...................................... 123/261; 123/255
(58) Field of Search ............................... 123/261, 254, 123/255, 225, 274

(56) References Cited

U.S. PATENT DOCUMENTS

| | | | | |
|---|---|---|---|---|
| 4,224,902 A | * | 9/1980 | Binder et al. ............... | 123/280 |
| 4,240,392 A | * | 12/1980 | Matayoshi et al. ...... | 123/145 A |
| 4,270,499 A | * | 6/1981 | Frelund ...................... | 123/293 |
| 4,873,952 A | * | 10/1989 | Narita et al. ................. | 123/270 |
| 5,293,851 A | | 3/1994 | Schaub ........................ | 123/259 |

FOREIGN PATENT DOCUMENTS

DE  44 19 429 C2  7/1998  ........... F02B/19/00

* cited by examiner

*Primary Examiner*—Bibhu Mohanty
(74) *Attorney, Agent, or Firm*—Cohen, Pontani, Lieberman & Pavane

(57) ABSTRACT

A self-igniting, mixture-compressing internal combustion engine for fuel gas includes a cylinder including a cylinder head (5); an insert (1) operably engaged with the cylinder head (5); a main combustion space (7) in the cylinder; and a prechamber (4) in the insert (1). A low-pressure fuel line is connected to the main combustion space (7). A nozzle (10) is at least partially disposed in the insert (1). The nozzle (10) is operably connected to a high-pressure fuel line. The nozzle (10) is used to inject fuel gas into the prechamber (4). At least one injection opening (6) for connects the prechamber (4) to the main combustion space (7) and passes the fuel gas from the prechamber (4) to the main combustion space (7).

8 Claims, 2 Drawing Sheets

SELF-IGNITING, MIXTURE-COMPRESSING INTERNAL COMBUSTION ENGINE AND METHOD FOR ITS OPERATION

PRIORITY CLAIM

This application claims priority to application 102 17 996.4 filed on Apr. 23, 2002 in Germany.

FIELD OF THE INVENTION

The invention relates to a self-igniting, mixture-compressing internal combustion engine and to a method of operating same.

BACKGROUND OF THE INVENTION

DE 44 19 429 discloses an internal combustion engine that burns a gaseous fuel/air mixture in a main combustion space, the mixture being ignited from a combustion prechamber. The prechamber is connected to a high-pressure fuel-gas line and forms a fuel-rich mixture which self-ignites and, as a result of the further increase in pressure, flows over into the main combustion space where it burns completely and in the process ignites the compressed fuel/air mixture.

SUMMARY OF THE INVENTION

It is an object of the invention to significantly reduce the proportion of fuel gas, which is injected in highly compressed form into the prechamber.

This and other objects are achieved by the present invention. A self-igniting, mixture-compressing internal combustion engine for fuel gas includes a cylinder including a cylinder head; an insert operably engaged with the cylinder head; a main combustion space in the cylinder; and a prechamber in the insert. A low-pressure fuel line is connected to the main combustion space. A nozzle is at least partially disposed in the insert. The nozzle is operably connected to a high-pressure fuel line. The nozzle is used to inject fuel gas into the prechamber. At least one injection opening for connects the prechamber to the main combustion space and passes the fuel gas from the prechamber (4) to the main combustion space.

In an internal combustion engine of the present invention, the operating temperatures of the gas-injection valve may be advantageously reduced and long service lives may be achieved using a heat shield.

Advantageous special shielding of the glow plug tip ensures reliable ignition of the prechamber mixture and increases the service life of the glow plug.

The self-cleaning effect of a throttle pintle nozzle, which is preferably used, advantageously leads to conditions for injecting gas into the prechamber which are constant over the operating time.

As a result of the ratio of the prechamber volume to the ejection cross-section of the main combustion space, which is predetermined according to the invention, small cycle fluctuations occur. This results in an advantageously stable operation of the internal combustion engine.

In one embodiment, the advantageous gas-injection valve can be particularly favorably realized by arranging simple components.

The prechamber gas proportion, which is preferably set between approximately 0.2% and 0.3%, results in optimal operating values and operating behavior.

The invention reduction in the proportion of prechamber gas and the resultant reduced compressor work leads to an advantageous increase in the effective efficiency of the internal combustion engine.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 1 is a cross-sectional view of a partial internal combustion engine and insert in accordance with one embodiment of the present invention wherein a shield of the nozzle is substantially sleeve-like.

FIG. 2 is a cross-sectional view of a partial internal combustion engine and insert in accordance with one embodiment of the present invention wherein a shield of the nozzle is substantially disk-like.

DETAILED DESCRIPTION OF THE PRESENTLY PREFERRED EMBODIMENTS

Figure 1:
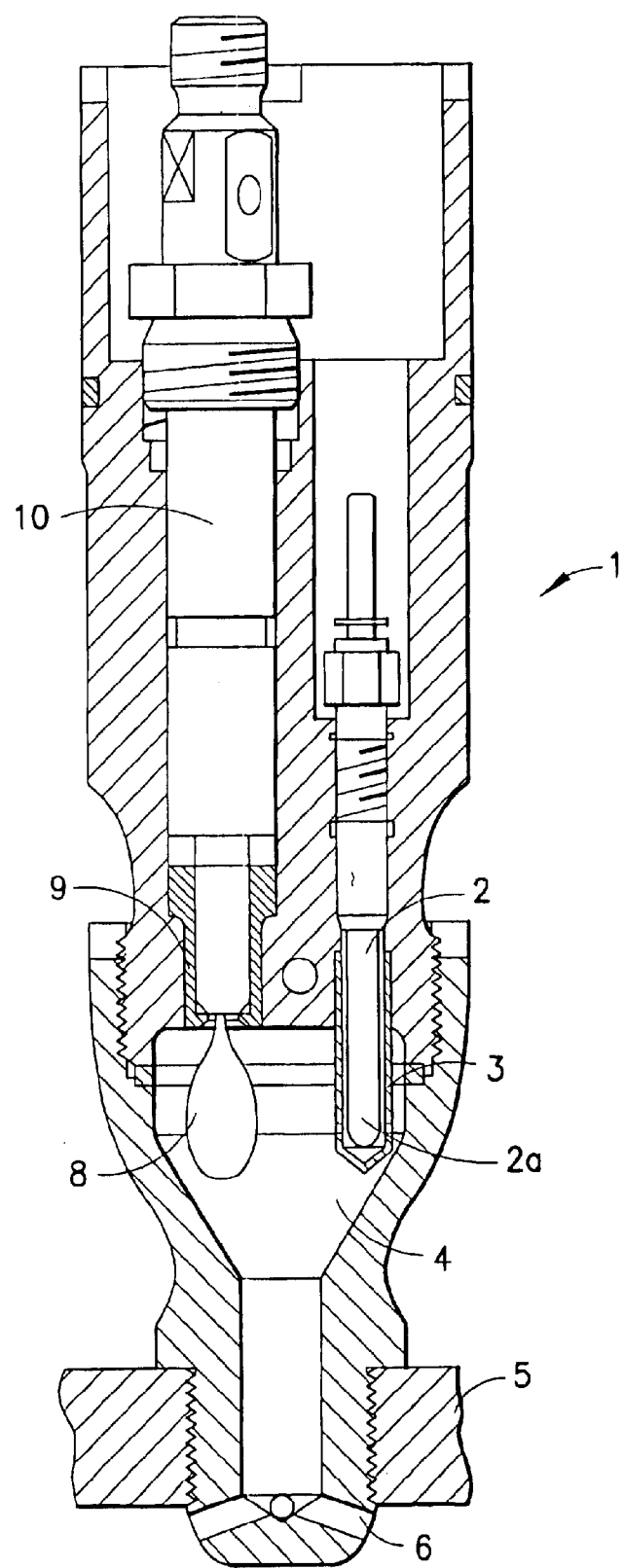

Herein, the invention is explained in greater detail using an exemplary embodiment. Parts of an internal combustion engine designed according to the present invention are shown in FIG. 1. The customary devices for gas exchange and a piston, which are not shown in FIG. 1, are provided at the cylinder and combustion space. The cylinder head 5, into which an insert 1 is mounted, for example by screwing it in, is not shown i.e. is broken away. A prechamber 4 which is connected to the main combustion space 7 by preferably a plurality of passage openings 6 that are formed in the insert 1.

Fuel gas is introduced at high pressure into the prechamber 4, forming a jet 8, through a nozzle 10, preferably a throttle pintle nozzle as used herein interchangeably. As a result of the characteristics of jet 8, the fuel gas can mix very intensively with the fuel/air mixture present in the prechamber 4 before it ignites on the hot surface of the glow plug tip 2a or self-ignites. The resultant rapid increase in pressure in the prechamber 4 ensures stable ignition of the relatively lean fuel gas/air mixture in the main combustion space 7. In addition to these advantages, preferably the throttle pintle nozzle 10 has a self-cleaning effect, thus carbon deposits are prevented at its ejection cross-section.

Figure 2:
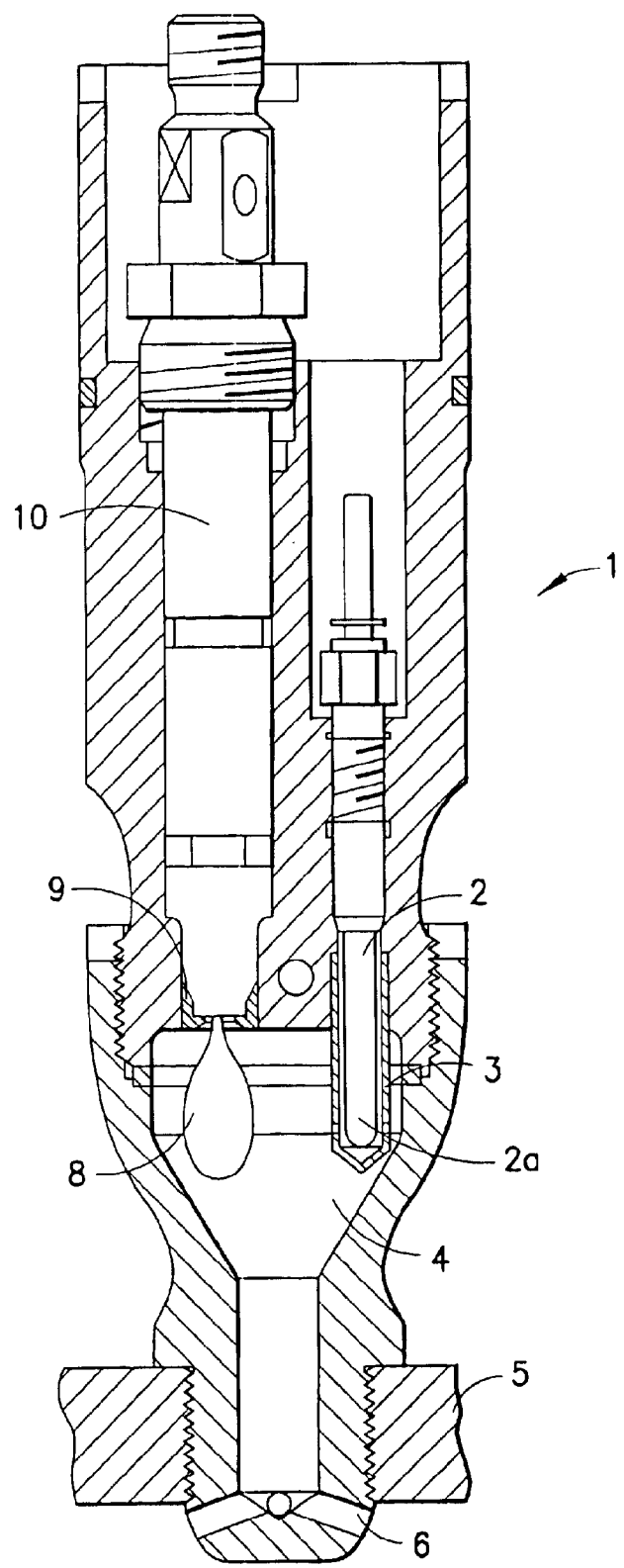

The throttle pintle nozzle 10 is subjected to high thermal stresses because of the low internal cooling resulting from using fuel gas having a relatively low heat capacity and poor heat transfer compared to liquid fuels, and further because of the low amounts of fuel flushed through the nozzle 10. Thermal stresses can be reduced by providing a protective shield 9 which shields the throttle pintle nozzle 10 with respect to the prechamber 4 so that heat transfer from the prechamber 4 is reduced. The protective shield 9 preferably consists of a material with good thermal conductivity, such as copper, and is of disc-shaped or sleeve-shaped design. The sleeve-shaped protective shield 9 shown by way of example in FIG. 1 encloses the throttle pintle nozzle 10 in the front region. An opening for the ejection of the fuel gas is provided in the ejection region. This opening can be provided with a conical depression in order to avoid impeding the jet 8. In one embodiment, illustrated in FIG. 2, protective shield 9 is disk-shaped and is arranged only in the region of the ejection opening of the nozzle without the front region being sleeved.

Returning to FIG. 1, the pintle of the throttle pintle nozzle 10 is controlled by a hydraulic system rather utilizing a closing spring. Therefore, the static pressure of the hydraulic system is greater than the constant gas injection pressure. This ensures that no fuel gas can escape. The play of the pintle in its guide is matched to the viscosity of the hydraulic oil in such a way that the hydraulic oil lubricates the valve seat. The leakage rate is limited to such an extent that none or at most very small amounts of the hydraulic oil take part in the combustion. Thus, the service life of the parts is advantageously increased and the occurrence of carbon deposits which can adversely affect the stability of the combustion and the exhaust emissions is avoided.

The throttle pintle nozzle 10 is preferably controlled with a solenoid valve by means of which the hydraulic pressure can be disengaged or applied. The commencement and duration of opening can thus advantageously be freely stipulated or set.

A glow plug 2 may be provided to ignite the fuel gas/air mixture in the prechamber 4. The tip 2a of the glow plug 2 projects into the prechamber 4. The dissipation of heat by forced convection can be reduced while the prechamber 4 is being flushed and the surface temperature of the glow plug tip 2a can be increased using advantageous shielding 3. Shielding 3 encloses the tip of the glow plug 2 and is provided with appropriate openings or bores. Thus, during starting and at a low engine part-load, the self-ignition temperature of the mixture in the prechamber 4 is always reached reliably while the heating power of the glow plug 2 can be reduced to zero at relatively high engine loads. This also increases the service life of the glow plug 2 considerably because its heating coil is not under constant thermal stress. Carefully arranged openings in the shielding 3 can allow combustible mixture to be present between the shielding 3 and the glow plug tip 2a. The shielding 3 of the glow plug tip 2a must be manufactured from a material with high temperature resistance and can be catalytically coated for further optimization.

After self-ignition of the fuel gas, the pressure in the prechamber 4 rises rapidly so that the partially combusted gas is injected through the passage openings 6 into the main combustion space 7 and ignites the fuel gas/air mixture there. An optimal pressure increase in the prechamber 4 with subsequent intensive ejection into the main combustion space 7 can be achieved by a predetermined ratio of the volume of the prechamber 4 to the cross-section of the passage openings 6. Thus, advantageous stable ignition of the fuel gas/air mixture in the main combustion space 7 is achieved.

Advantageously, only slight cycle fluctuations occur during the combustion process in an internal combustion engine using the present invention because of the reliable and stable ignition in the main combustion space 7. The ratio of the volume of the prechamber 4 to the ejection cross-section of the injection openings 6 advantageously is between 50 and 80 $cm^3/cm^2$ (cubic centimeters/square centimeters).

The internal combustion engine according to the invention may be operated using a method where less than 0.5%, preferably between 0.2 and 0.3%, of the total fuel gas used for operation is injected in highly compressed form into the prechamber 4. The fuel gas is in the process injected into the prechamber 4 at a pressure that lies above the final compression pressure of the intake fuel/air mixture in the main combustion space 7. The fuel forms a fuel-rich fuel/air mixture in the prechamber 4, which mixture self-ignites and flows over into the main combustion space 7 where it ignites the compressed relatively lean fuel/air mixture.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should recognized that structures and/or elements and/or method steps shown and/or described in connection with any disclosed form or embodiment of the invention may be incorporated in any other disclosed or described or suggested form or embodiment as a general matter of design choice. It is the invention, therefore, to be limited only as indicated by the scope of the claims appended hereto.

What is claimed is:

1. A self-igniting, mixture-compressing internal combustion engine for gaseous fuel, the engine comprising:
   a cylinder head;
   a main combustion space which receives a low pressure fuel gas/air mixture; and
   an insert received in the cylinder head, the insert comprising a prechamber, a nozzle connected to a high pressure fuel gas line for injecting fuel gas into the prechamber, and at least one injection opening connecting the prechamber to the main combustion space, the at least one injection opening having a total cross-sectional area.

2. A self-igniting, mixture-compressing internal combustion engine as in claim 1 wherein the nozzle is a throttle pintle nozzle comprising a pintle, a pintle guide, and a pintle seat, the nozzle having a region adjoining the prechamber and a protective shield provided in said region.

3. A self-igniting, mixture-compressing internal combustion engine as in claim 2 wherein the protective shield is made of copper.

4. A self-igniting, mixture-compressing internal combustion engine as in claim 2 wherein the protective shield is in the form of a sleeve.

5. A self-igniting, mixture-compressing internal combustion engine as in claim 2 further comprising:
- a hydraulic system for controlling the throttle pintle nozzle; and
- a solenoid valve for freely selecting the commencement and duration of applying hydraulic pressure.

6. A self-igniting, mixture-compressing internal combustion engine as in claim 5 wherein the hydraulic system operates at a static pressure which is greater than the injection pressure of the fuel gas into the prechamber, the hydraulic system comprising a hydraulic oil having a viscosity matched to the play of the pintle in the pintle guide so that the pintle seat is lubricated in such a way that only a negligible amount of hydraulic oil is injected into the prechamber with the fuel gas.

7. A self-igniting, mixture-compressing internal combustion engine as in claim 5 further comprising:
- a glow plug extending into the prechamber; and
- a temperature resistant shield surrounding the glow plug where the glow plug extends into the prechamber.

8. A self-igniting, mixture-compressing internal combustion engine as in claim 2 wherein the prechamber has a volume with a ratio to the total cross-sectional area of the at least one injection opening in the range of 50 to 80 $cm^3/cm^2$.

* * * * *